Patented Dec. 4, 1945

2,390,278

UNITED STATES PATENT OFFICE 2,390,278

PROCESS FOR THE PRODUCTION OF TROPIC ACID

Meyer Sletzinger, Bronx, N. Y., and Grover C. Paulsen, Jr., Harrisonburg, Va., assignors to Merck & Co., Inc., Rahway, N. J., a corporation of New Jersey No Drawing. Application April 30, 1943, Serial No. 485,152

8 Claims. (Cl. 260—473)

This invention relates to an improved process for the production of d-l-tropic acid, and esters thereof.

Tropic acid,

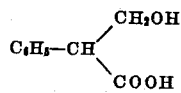

is an important intermediate in the synthesis of atropine.

It has been proposed to produce tropic acid by reducing purified phenyl-α-hydroxymethylene acetic acid ethyl ester (sometimes referred to in terms of its tautomer, formyl-phenyl-acetic acid ethyl ester) by means of aluminum amalgam. However, such process is not satisfactory from the practical viewpoint, and results in only very low yields of tropic acid. The aluminum residue retains almost half of the starting material, which is not reduced, and cannot be removed from the residue.

It has also been proposed to catalytically reduce a purified phenyl-α-hydroxymethylene acetic acid ester in the presence of palladium catalyst, but this process gives an impure product, with poor yields.

We have now discovered that tropic acid may be produced in quantitative yields by a simple economical process.

According to our invention, a lower alkyl ester of phenyl-α-hydroxymethylene acetic acid is catalytically reduced in the presence of Raney nickel. The reduction product may be hydrolyzed, as for example, in aqueous barium hydroxide solution, and tropic acid recovered.

The reaction may be illustrated as follows, in terms of the ethyl ester:

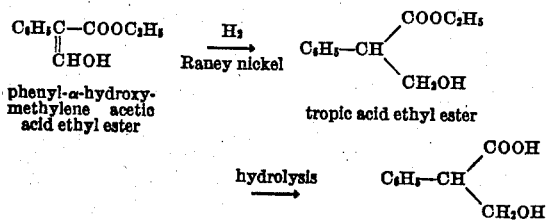

Also, we have discovered, within the scope of our invention, and as a further embodiment thereof, that when Raney nickel is utilized as catalyst, crude phenyl-α-hydroxymethylene acetic acid ester may be used as starting material, instead of a purified form as previously thought necessary. Such purification involved a distillation step in which about 30% of the phenyl-α-hydroxy methylene acetic acid was decomposed.

The following example illustrates a method of carrying out the present invention, but it is to be understood that this example is given by way of illustration and not of limitation.

Example 8.1 gms. of phenyl-α-hydroxymethylene acetic acid ethyl ester are dissolved in 50 cc. of absolute ethanol. Raney nickel is added to the solution, which is then hydrogenated until the required amount of hydrogen is absorbed. The catalyst is filtered, and the solvent removed by evaporation. The hydrogenated product (an oil) is hydrolyzed in aqueous barium hydroxide solution, acidified, extracted with ether, dried over sodium sulfate, and the ether evaporated. The remaining oil crystallizes. Benzene is added, and the material filtered. Tropic acid of melting point 117° C. is obtained in quantitative yield.

Instead of the ethyl ester of phenyl-α-hydroxymethylene acetic acid exemplified as starting material in the foregoing specific illustration of our invention, other lower alkyl esters of the acid may be employed, as for instance, the methyl, propyl, butyl esters, etc.

Modifications may be made in carrying out the present invention, without departing from the spirit and scope thereof, and we are to be limited only by the appended claims.

We claim:

1. Process comprising hydrogenating a lower alkyl ester of phenyl-α-hydroxymethylene acetic acid in the presence of Raney nickel.

2. Process comprising hydrogenating phenyl-α-hydroxymethylene acetic acid ethyl ester in the presence of Raney nickel.

3. Process comprising hydrogenating a lower alkyl ester of phenyl-α-hydroxymethylene acetic acid in the presence of Raney nickel, and recovering an ester of tropic acid.

4. Process comprising hydrogenating a lower alkyl ester of phenyl-α-hydroxymethylene acetic acid in the presence of Raney nickel, and recovering tropic acid.

5. Process comprising hydrogenating phenyl-α-hydroxymethylene acetic acid ethyl ester in the presence of Raney nickel, and recovering the ethyl ester of tropic acid.

6. Process comprising hydrogenating phenyl-α-hydroxymethylene acetic acid ethyl ester in the presence of Raney nickel, and recovering tropic acid.

7. Process comprising hydrogenating a lower alkyl ester of phenyl-α-hydroxymethylene acetic acid in the presence of Raney nickel, hydrolyzing the reduction product, and recovering tropic acid.

8. Process comprising hydrogenating phenyl-α-hydroxymethylene acetic acid ethyl ester in the presence of Raney nickel, hydrolyzing the reduction product, and recovering tropic acid.

MEYER SLETZINGER.
GROVER C. PAULSEN, Jr.